:::

(12) United States Patent
Vadhri

(10) Patent No.: US 8,196,813 B2
(45) Date of Patent: Jun. 12, 2012

(54) SYSTEM AND METHOD TO ALLOW ACCESS TO A VALUE HOLDING ACCOUNT

(75) Inventor: Srinivas Vadhri, Cupertino, CA (US)

(73) Assignee: eBay Inc., San Jose, CA (US)

( * ) Notice: Subject to any disclaimer, the term of this patent is extended or adjusted under 35 U.S.C. 154(b) by 674 days.

(21) Appl. No.: 12/327,665

(22) Filed: Dec. 3, 2008

(65) Prior Publication Data

US 2010/0133334 A1 Jun. 3, 2010

(51) Int. Cl.
*G06Q 40/00* (2012.01)
*G06Q 20/00* (2012.01)
*G07D 11/00* (2006.01)
*G07F 19/00* (2006.01)
*G06K 5/00* (2006.01)

(52) U.S. Cl. ............ 235/379; 235/380; 705/35; 705/44; 705/65

(58) Field of Classification Search ............. 235/379, 235/380, 382, 487, 492; 705/35, 39, 41, 705/64, 65, 17, 44
See application file for complete search history.

(56) References Cited

U.S. PATENT DOCUMENTS

| | | | | |
|---|---|---|---|---|
| 5,883,810 A | * | 3/1999 | Franklin et al. | 700/232 |
| 6,339,766 B1 | * | 1/2002 | Gephart | 705/44 |
| 7,793,851 B2 | * | 9/2010 | Mullen | 235/493 |
| 7,841,539 B2 | * | 11/2010 | Hewton | 235/492 |
| 2001/0047330 A1 | * | 11/2001 | Gephart et al. | 705/39 |
| 2002/0120583 A1 | * | 8/2002 | Keresman et al. | 705/65 |
| 2005/0154643 A1 | * | 7/2005 | Doan et al. | 705/26 |
| 2007/0114274 A1 | * | 5/2007 | Gibbs et al. | 235/380 |
| 2007/0170247 A1 | * | 7/2007 | Friedman | 235/380 |
| 2008/0217396 A1 | * | 9/2008 | Boalt | 235/380 |
| 2008/0222047 A1 | * | 9/2008 | Boalt | 705/67 |
| 2009/0048971 A1 | * | 2/2009 | Hathaway et al. | 705/41 |
| 2010/0138347 A1 | * | 6/2010 | Chen | 705/44 |
| 2011/0153437 A1 | * | 6/2011 | Archer et al. | 705/17 |

FOREIGN PATENT DOCUMENTS

WO   WO 2008139282 A1 * 11/2008

* cited by examiner

*Primary Examiner* — Michael G Lee
*Assistant Examiner* — Suezu Ellis
(74) *Attorney, Agent, or Firm* — Schwegman, Lundberg & Woessner, P.A.

(57) ABSTRACT

This document discusses, among other things, a system and method of allowing access to a value holding account. In various example embodiments, the value holding account is associated with a first account code that allows access to the value holding account. Some example embodiments include receiving a request for a second account code that is based on the first account code, and providing the second account code based on receiving the request for the second account code. The first account code may to allow access to the value holding account for a first determinable period and the second account code may allow access to the value holding account for a second determinable period that is different from the first determinable period.

9 Claims, 8 Drawing Sheets

| USER ID | PERSISTENT CARD NUMBER/EXP. TIME | TEMPORARY CARD NUMBER/EXP. TIME | TEMPORARY CARD NUMBER/EXP. TIME HISTORY |
|---|---|---|---|
| 1 | 1234567891011121/3-08 | T4444555566666777/02-08-08,1130 | T231517192325272/02-08-08, 0722; T11232527293135/01-04-08 |
| 2 | 3141516171819202/12-11 | T788889999101011/10-11-08,1330 | 0 |
| 3 | 122223242526272829/9-10 | T4555657585951 00/10-10-08,2045 | T031517192325272/02-13-07, 0722 |

SYSTEM AND METHOD TO ALLOW ACCESS TO A VALUE HOLDING ACCOUNT

TECHNICAL FIELD

This patent document pertains generally to value holding accounts and more particularly, but not by way of limitation, to systems and methods for accessing a value holding account.

BACKGROUND

A value holding account may hold anything considered valuable. An account holder may access his or her value holding account using an account code such as an account number including a sequence of numbers.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

Overview

Figure 1:
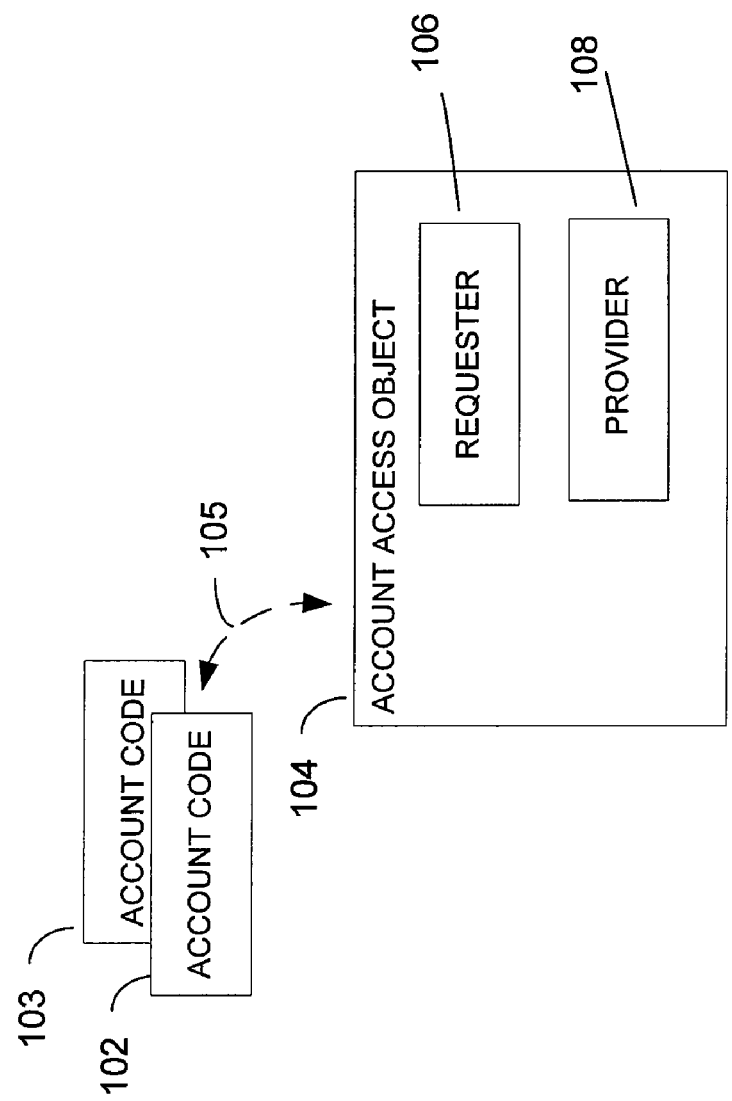
FIG. 1 is a block diagram showing an account access object, in accordance with an example embodiment.

Various example embodiments include a credit card from which a temporary card number may be requested and displayed so that the temporary card number can be used to purchase goods and/or services. The credit card may include a traditional 16-digit credit card number and associated expiration date that can be used for account identification and/or account verification. As used herein, a credit card is an example of an account access object. It may be noted that the present subject matter is not limited to a credit cards and credit card accounts, any type of value holding account may be associated with an account access object. Example account access objects may include financial instruments such as check cards, gift cards, credit cards, charge cards, debit cards or any other physical object.

For some example embodiments, a user may make a request for the example temporary card number by selecting a selectable switch or button on the credit card. The selector may be implemented in software and may be activated, for example, via a touch sensitive screen. The example credit card may receive the request and wirelessly transmit the request for the temporary card number to a generator of the example temporary card number (e.g., a remote server). For some example embodiments, the temporary card number is received wirelessly from the source and displayed by a liquid crystal display (LCD) on the credit card. The temporary card number may be made available using alternative or additional technologies (e.g., bar codes, magnetic encoding, etc.) without departing from the claimed subject matter.

In various example embodiments, both the credit card number and the temporary card number can be used up to an expiration date and/or time. The expiration date of the temporary card number may include a number of hours from the time of issue (e.g., 0.25-hours or 24-hours), while the expiration date of the traditional credit card number may include a number of years from the date of issue. By using the example temporary card number, a user may control the amount of time an account number is at risk of fraud due to being exposed on the internet and/or to merchants or any other person or machine. For example, a user's credit card number may be at risk for a number of years when it is used to make a purchase via the internet, while for the same purchase, a user's temporary card number would be at risk for a number of hours.

The example embodiments include references to the accompanying drawings, which form a part of the detailed description. The drawings show illustrations in accordance with example embodiments. These example embodiments, which may also referred to herein as "examples," are described in enough detail to enable those skilled in the art to practice the claimed subject matter. The example embodiments may be combined, other embodiments may be utilized, or structural, logical and electrical changes may be made without departing from the scope what is claimed. The detailed description is, therefore, not to be taken in a limiting sense, and the scope is defined by the appended claims and their equivalents.

Example Embodiments

FIG. 1 is a block diagram showing an account access object 104 associated with a persistent account code 102 and temporary account code 103, in accordance with an example embodiment. The double arrows 105 represent an association between the account access object 104 and the persistent and temporary account codes 102 and 103.

The account access object 104 is a physical object (e.g., a plastic card, a cell phone, a key chain or any other object) that may be presented or otherwise used to access a value holding account, via the persistent and temporary account codes 102 and 103. The account access object 104 may include a physical financial instrument. For example, the account access object 104 may function as a credit card, debit card, gift card or the like. Using the account access object 104, a user may present an account code (e.g., the persistent account code 102) in order to charge, debit or credit the value holding account to which the account access object 104 corresponds.

The account access object 104 is to allow for the generation of the temporary account code 103, while the persistent account code 102 is to be persistent relative to the temporary account code 103. The persistent account codes 102 and the temporary account code 103 are separate codes that may be presented to a proprietor of a value holding account, to access the value holding account. In some example embodiments, the persistent account code 102 and the temporary account code 103 may each include a sequence of alphanumeric characters.

In some example embodiments, the persistent account code 102 is imprinted on the account access object 104 and encoded within a magnetic strip (not shown) or a barcode (not shown). Alternatively or additionally, the persistent account code 102 may be made available by radio frequency identification (RFID) or other medium. The persistent account code 102 may be associated with the account access object 104 in various alternative or additional fashions without departing from the claimed subject matter.

The account access object 104 is shown to include a requester 106 and a provider 108. The requester 106 may allow for the request of the temporary account code 103. In some example embodiments, the requester 106 is selectable by a user to request the temporary account code 103. A selectable requester 106 may include a button or touch screen that may be depressed to indicate a request to hardware and/or software implemented logic included within the requester 106.

Alternatively or additionally, the requester 106 may be communicatively coupled to a radio receiver to receive from a remote machine or device, a wireless request for the temporary account code 103. In various example embodiments, the requester 106 is to forward requests for the temporary account code 103 to a generator of the temporary account code 103. For some example embodiments the generator of the temporary account code 103 includes a machine (not shown) communicatively coupled to the account access object via a network. Without departing from the claimed subject matter, the provider 108 located on the account access object 104 may alternatively or additionally generate and provide the temporary account code 103.

The provider 108 is to make the temporary account code 103 available for use to access a value holding account. As stated above, the provider 108 may generate the temporary account code 103. The provider 108 may include hardware and/or software logic configured to securely generate and store random numbers (e.g., and/or characters) randomly sequenced to form the temporary account code 103.

For some example embodiments, the provider 108 is to receive the temporary account code 103 after it has been generated externally (e.g., on a machine connected to a wireless network) from the account access object 104. The externally generated temporary account code 103 may be received wirelessly (e.g., Bluetooth, Wi-Fi, etc.), via a wireless radio implemented on the provider 108. Alternatively or additionally, the provider 108 may receive the temporary account code 103 by magnetization or wired connection.

Whether the provider 108 generates or receives the temporary account code 103, the provider 108 is to allow the temporary account code 103 to be ascertained by a human or machine user (not shown). For some example embodiments, the temporary account code 103 to be read via liquid crystal diode (LCD) screen or other display technology of the provider 108. Various example embodiments may include the temporary account code 103 being made available wireless (e.g., to a cell phone screen) or physically (e.g., by swiping a magnetic strip to be read by the payment machine).

Figure 2:
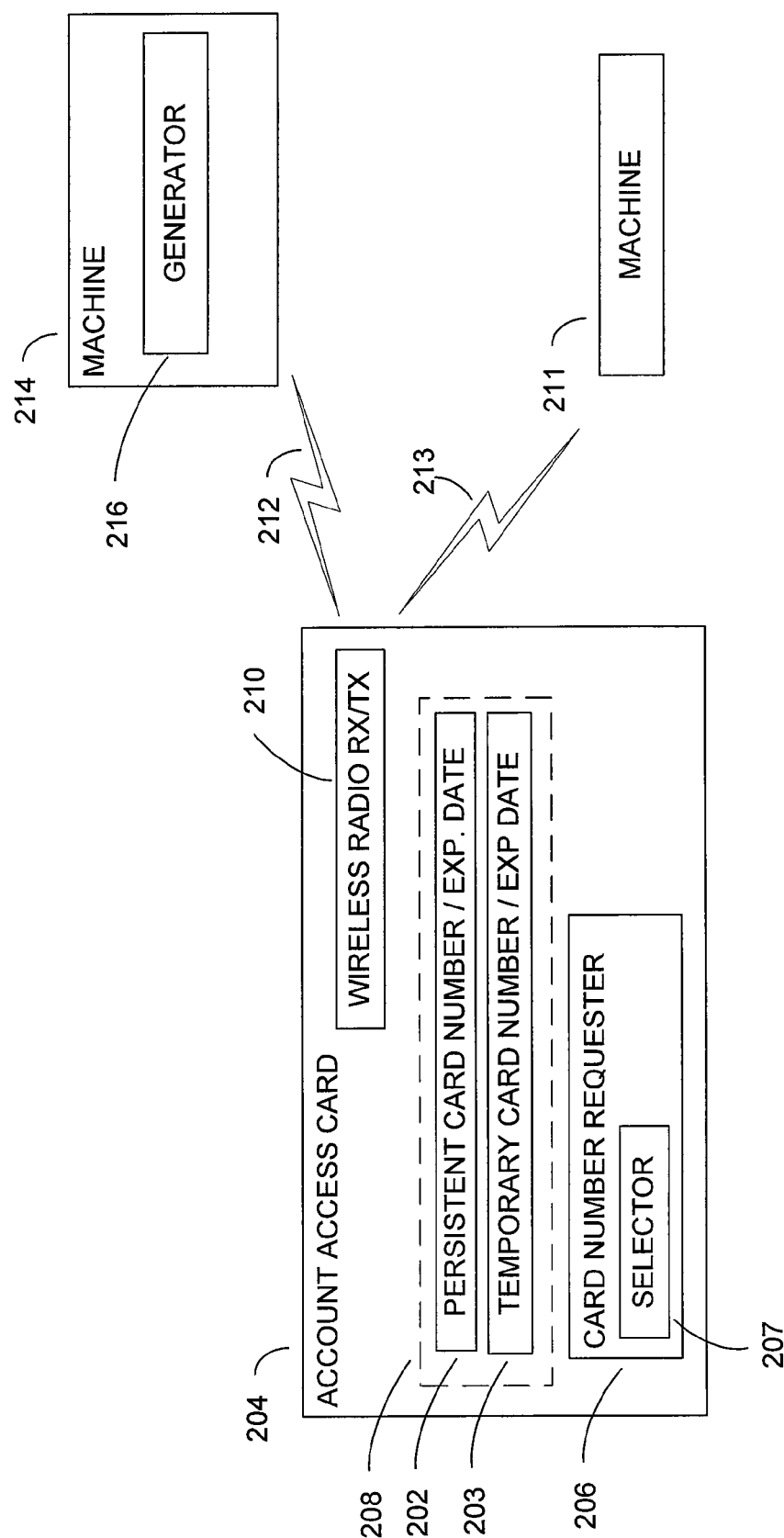
FIG. 2 is a block diagram showing an account access card communicatively coupled to a machine, in accordance with an example embodiment.

FIG. 2 is a block diagram showing an account access card 204 that may wirelessly communicate with a machine 214, in accordance with an example embodiment. The account access card 204 and its components represent example embodiments of the account access object 104 of FIG. 1.

FIG. 2 is shown to include a card number portion 208 (an example embodiment of the provider 108 of FIG. 1) to provide via LCD and/or imprinting, a persistent card number/expiration date 202 and a temporary card number/expiration date 203 (examples of the account codes 102 and 103 respectively of FIG. 1). Throughout this document, the word "persistent" when used in "persistent card number" means persistent relative to the temporary card number/expiration date 203. For example the temporary card number will always have an expiration date that is earlier than or equal to the persistent card number's expiration date.

The example card number requester 206 (an example embodiment of the requester 106 of FIG. 1) may include a physically selectable switch or selector 207 that a user may select to request a temporary card number/expiration date 203. Alternatively or additionally, a remote machine 211 may transmit a wireless signal 213 to the wireless radio 210 to request the temporary card number/expiration date 203. In some example embodiments, the remote machine 211 may include a mobile phone, or other mobile device with wireless capabilities.

Once a request for the temporary card number/expiration number 203 has been received, the wireless radio 210 may transmit via wireless signal 212, the request for the temporary card number/expiration date 203 to the machine 214 and receive the generated temporary card number/expiration date 203 via the wireless signal 212 from the machine 214. The wireless radio 210 may include any radio that is appropriate to transmit and receive the wireless signal 212, which may include Bluetooth, WiMax, WI-Fi or any other types of radio frequency signals.

The machine 214 is to receive a request for the temporary card number/expiration date 203 and to generate the temporary card number/expiration date 203 before transmitting it to the account access card 204 to be presented by the card number portion 208 of the account access card 204. The machine 214 may be communicatively coupled to a wireless radio (not shown) that transmits and receives wireless signals 212 on behalf of the machine 214. The machine 214 may include a generator 216 to receive requests and generate temporary card numbers.

Figure 3:
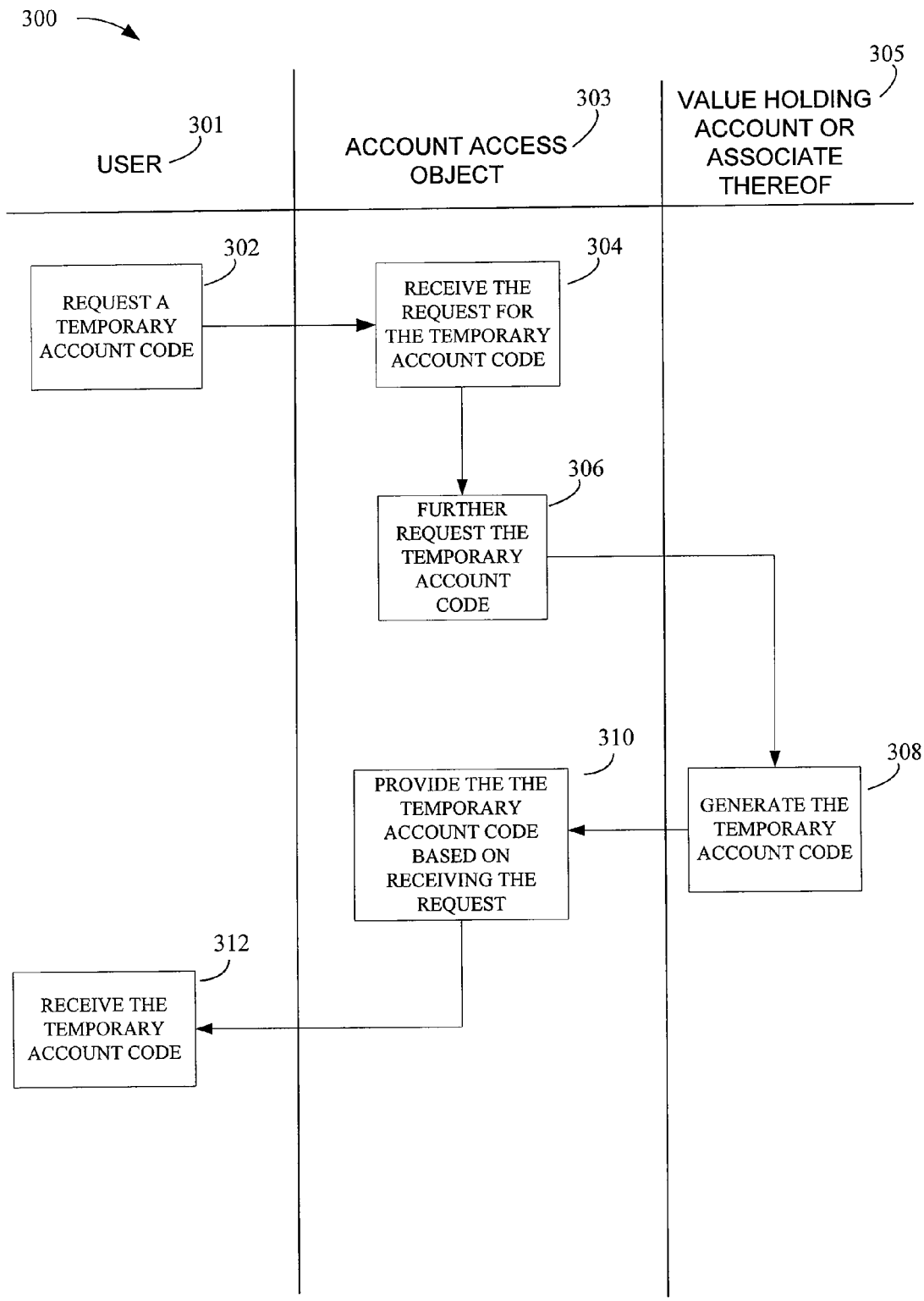
FIG. 3 is a flow diagram illustrating a flow for providing a temporary account code, in accordance with an example embodiment.

FIG. 3 is a flow diagram, showing a flow 300 of operations performed by entities for providing a temporary account code, in accordance with an example embodiment. FIG. 3 is shown to include a user 301 lane, an account access object 303 lane and a value holding account 305 lane.

Blocks shown in the user lane 301 represent user actions performed by a user of the account access card 202 of FIG. 2. The user may include an owner of a value holding account, a party authorized by an owner of the value holding account or a party not authorized by the owner of the value holding account. Further, the user may be a human user, a machine user or a combination of the two (e.g., a human user operating an access machine that interacts with the account access card 204).

Blocks shown in the account access object lane 303 represent account access object actions performed by the account access card 204 of FIG. 2. Blocks in the value holding account lane 305 represent actions taken by a proprietor of the value holding account such as a proprietor of the machine 214 of FIG. 2 (e.g., an account server).

It may be noted that the account access object 204 of FIG. 2 is a physical object, which may include circuitry (e.g., a processor, memory, logic circuitry, etc.). Operations performed by the various components of the account access object 204 and card 204 of FIG. 2 may be implemented via hardware, software (e.g., stored in memory) or a combination of hardware and software.

The flow 300 relates to accessing a value holding account. Examples of value holding accounts include credit card accounts, charge card accounts, debit card accounts, gift card accounts or any other value holding account that may be accessed.

At block 302, the flow 300 includes the user action of requesting an account code. For various example embodiments, the user is to request a temporary card number/expiration date 203 from the account access card 204 by interacting (e.g., selecting a selectable button or switch) with the card number requester 206 of FIG. 2. In some example embodiments, the account access card 204 is a physical financial instrument such as a credit card associated with a persistent account code such as credit card number.

The account access card 204 may display the persistent card number/expiration date 202, via a card number portion 208 (e.g., a provider). The persistent card number/expiration date 202 may be configured to allow access to a value holding account for a determinable period (e.g., an expiration time allowing several years of service) while the temporary card number/expiration date 203 may be configured to allow access to the value holding account for a different determinable period (e.g., an expiration time allowing 24 hours of service). In example embodiments, the determinable period associated with the temporary card number is to expire before at or before the expiration time of the determinable period associated with the persistent card number.

In different example embodiments, the persistent card number/expiration date 202 of FIG. 2 may include a credit card number, a charge card number, a debit card number, a gift card number, some combination of the above accounts or any other account code that may be used to access a value holding account.

At block 304 the flow 300 includes the account access object action of receiving the request for an account code (e.g., the temporary card number/expiration date 203). In an example embodiment, the requester 206 receives a physical selection indicating a request for the temporary card number/expiration date 203. The request may be generated via user activation of a selector 207 on the account access object. Alternatively or additionally, the requester 206 may include a wireless receiver to receive the request via a wireless connection.

At block 306, the flow 300 is shown to include the account access object action of further requesting the temporary account number from the value holding account, responsive to receiving the request for the temporary account code. For some example embodiments, the card number requester 206 is to transmit a further request for the temporary card number/expiration date 203 of FIG. 2 from a network machine (e.g., the account server 214), which is associated with the value holding account. The request may be wirelessly transmitted via wireless signal 212, based on the account access card 204 receiving the request for the temporary card number/expiration date 203. The account server 214, in response to receiving the request, may cause the generator 216 to generate the temporary card number/expiration date 203 and deliver it via wireless signal 212 to the account access card 204 (e.g., the provider). Such a response is indicated by the block 308 of FIG. 3.

At block 310, the flow 300 may include the account access object action of providing a user with the account access code (e.g., the temporary card number/expiration date 203 of FIG. 2). The card number portion 208 may receive the temporary card number/expiration date 203 wirelessly from the machine 214 (e.g., the account server), and provide the received temporary card number/expiration date 203. In various example embodiments, the card number portion 208 is to make the temporary card number/expiration date 203 accessible via display on an LCD screen, a barcode display, a magnetic encoder or any other appropriate medium. Block 312 of the flow 300 shows the user action of receiving the temporary account number from the account access object.

Figure 4:
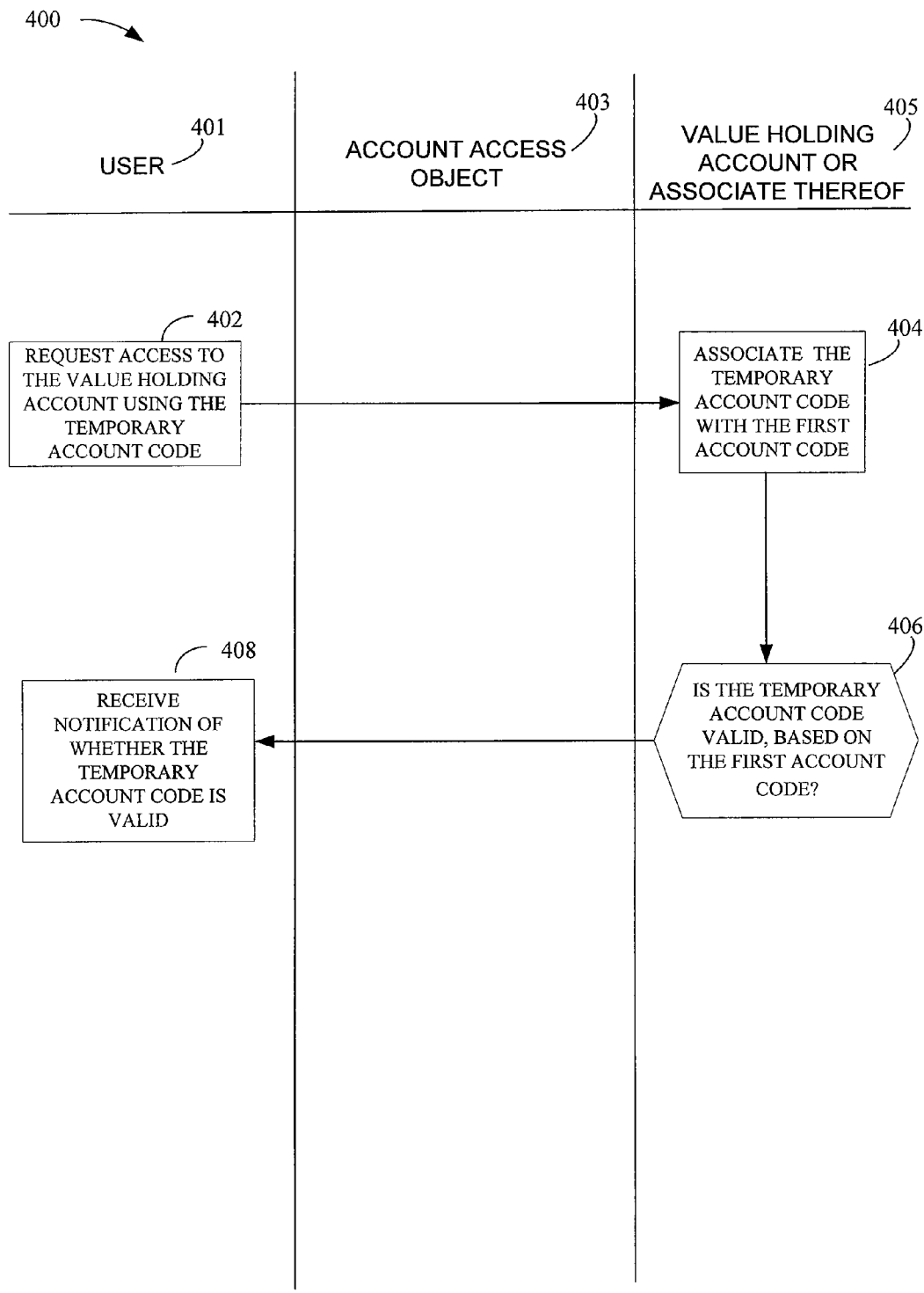
FIG. 4 is a flow diagram illustrating a flow for accessing a value holding account, in accordance with an example embodiment.

FIG. 4 is a flow diagram showing a flow 400 for accessing a value holding account, in accordance with an example embodiment. The user lane 401, an account access object lane 401 and a value holding account lane 401 shown in FIG. 4 may be substantially similar to the user lane 301, an account access object lane 303 and a value holding account lane 305 of FIG. 3.

At block 402, the flow 400 may include the user action of requesting access to the value holding account using the account code (e.g., the temporary card number/expiration date 203 of FIG. 2). In an example embodiment, the user may recite the displayed temporary card number/expiration date 203 to a merchant who may interact with the value holding account or an associate thereof to request access to the value holding account. Various other techniques used to request access to the value holding account may include swiping a magnetic strip (e.g., the card number portion) of the account access card 204 through a magnetic reader or scanning a bar code (e.g., the card number portion) of the account access card 204 with a bar code scanner. For some example embodiments, the wireless radio 210 of the account access card 204 may communicate the temporary card number/expiration date 203 to a remote machine (e.g., the machine 214) to access the value holding account.

At block 404 of the flow 400 includes the value holding account or an associate of the value holding account action of associating the account code (e.g., the temporary account code 203, of FIG. 2) with another account code assigned to the account access object (e.g., the persistent card number/expiration date 202). This may include a machine (e.g., the machine 214) accessing a table that associates persistent card numbers assigned to account access cards with temporary card numbers that have most recently been generated for the account access cards.

At block 406 of the method 400, the flow may include the value holding account or an associate of the value holding account action of determining whether or not the account code (e.g., the temporary account code 203 of FIG. 2) is a valid account code, based on another account code (e.g., the persistent card number) associated with the account access object 403. In example embodiments, the temporary card number/expiration date 203 is considered valid if it is associated with the persistent card number/expiration date 202 in the table referred to above.

At block 408 of the flow 400, the method may include the user action of receiving notification of whether the account code (e.g., the temporary account code of FIG. 2) is considered to be valid or invalid. In some example embodiments, notification may be sent to a card reader and/or to the account access card itself via wired and/or wireless signals. In an example embodiment, a valid temporary card number or the persistent card number may be used to access what is of value within the value holding account 405. For some example embodiments, this may include receiving authorization to purchase goods and/or services using the persistent card number/expiration date 202 or the temporary card number/expiration date 203 of the account access card 204.

Figure 5:
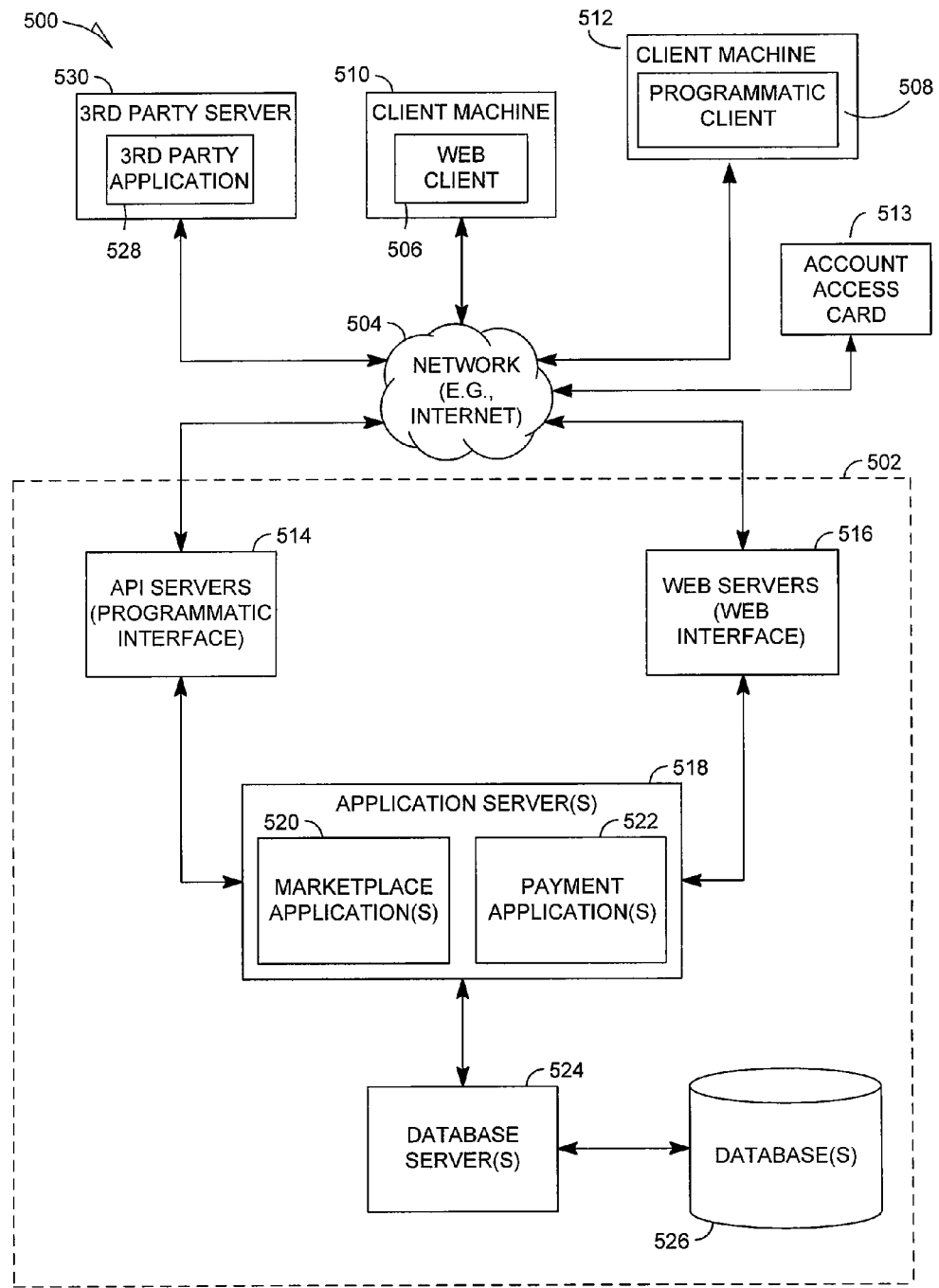
FIG. 5 is a network diagram depicting a client-server system, within which example embodiments may be deployed.

FIG. 5 is a network diagram depicting a client-server system 500, within which example embodiments may be deployed. A networked system 502, in the example forms of a network-based marketplace or publication system, provides server-side functionality, via a network 504 (e.g., the Internet or Wide Area Network (WAN)) to one or more clients. FIG. 5 illustrates, for example, a web client 506 (e.g., a browser, such as the Internet Explorer browser developed by Microsoft Corporation of Redmond, Wash. State), and a programmatic client 508 executing on respective client machines 510 and 512. In various example embodiments, an account access card 513 may be communicatively coupled to the network 504 via wireless connection. In some example embodiments, the account access card 513 is substantially similar to the account access card 204 of FIG. 2.

An Application Program Interface (API) server 514 and a web server 516 are communicatively coupled to, and provide programmatic and web interfaces respectively to, one or more application servers 518. The application servers 518 host one or more marketplace applications 520 and payment applications 522. The application servers 518 are, in turn, shown to be coupled to one or more databases servers 524 that facilitate access to one or more databases 526.

The marketplace applications 520 and the payment applications 522 may exist in a production environment, where the applications 520 and 522 provide functions and services associated with actual commercial activity relating to subject matter of value and real users or entities. Alternatively or additionally the marketplace applications 520 and the payment applications 522 may exist in a testing environment (e.g., testing of API calls) associated with fictitious commercial activity relating to fictitious subject matter and fictitious users or entities.

The marketplace applications 520 may provide a number of marketplace functions and services to users that access the networked system 502. The payment applications 522 may likewise provide a number of payment services and functions to users. The payment applications 522 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 520. In some example embodiments, the payment applications 522 may include one or more applications (e.g., an account number application, discussed below) that facilitate a user accessing a value holding account via the account access card 513 and the API servers 514 or the web servers 516. While the marketplace and payment applications 520 and 522 are shown in FIG. 5 to both form part of the networked system 502, it will be appreciated that, in alternative embodiments, the payment applications 522 may form part of a payment service that is separate and distinct from the networked system 502.

Further, while the system 500 shown in FIG. 5 employs client-server architecture, the present subject matter is, of course, not limited to such an architecture, and could equally well find application in a distributed, or peer-to-peer, architecture system, for example. The various marketplace and payment applications 520 and 522 could also be implemented as standalone software programs, which do not necessarily have networking capabilities.

The programmatic client 508 accesses the various services and functions provided by the marketplace and payment applications 520 and 522 via the programmatic interface provided by the API server 514. The programmatic client 508 may, for example, be a seller application (e.g., the TurboLister application developed by eBay Inc., of San Jose, Calif.) to enable sellers to author and manage listings on the networked system 502 in an off-line manner, and to perform batch-mode communications between the programmatic client 508 and the networked system 502.

The web client 506 may access the various marketplace and payment applications 520 and 522 via the web interface supported by the web server 516. As described above, the example web client 506 (e.g., a web browser) may be used as an interface to submit API calls and related information for the purpose of testing an API call.

As stated above, the account access card 513 may access the payment applications via the API server (e.g., using API calls) or through the web servers 516 to engage in account access operations.

FIG. 5 also illustrates a third party application 528, executing on a third party server machine 530, as having programmatic access to the networked system 502 via the programmatic interface provided by the API server 514. For example, the third party application 528 may, utilizing information retrieved from the networked system 502, support one or more features or functions on a website hosted by the third party. The third party website may, for example, provide one or more promotional, marketplace or payment functions that are supported by the relevant applications of the networked system 502.

Figure 6:
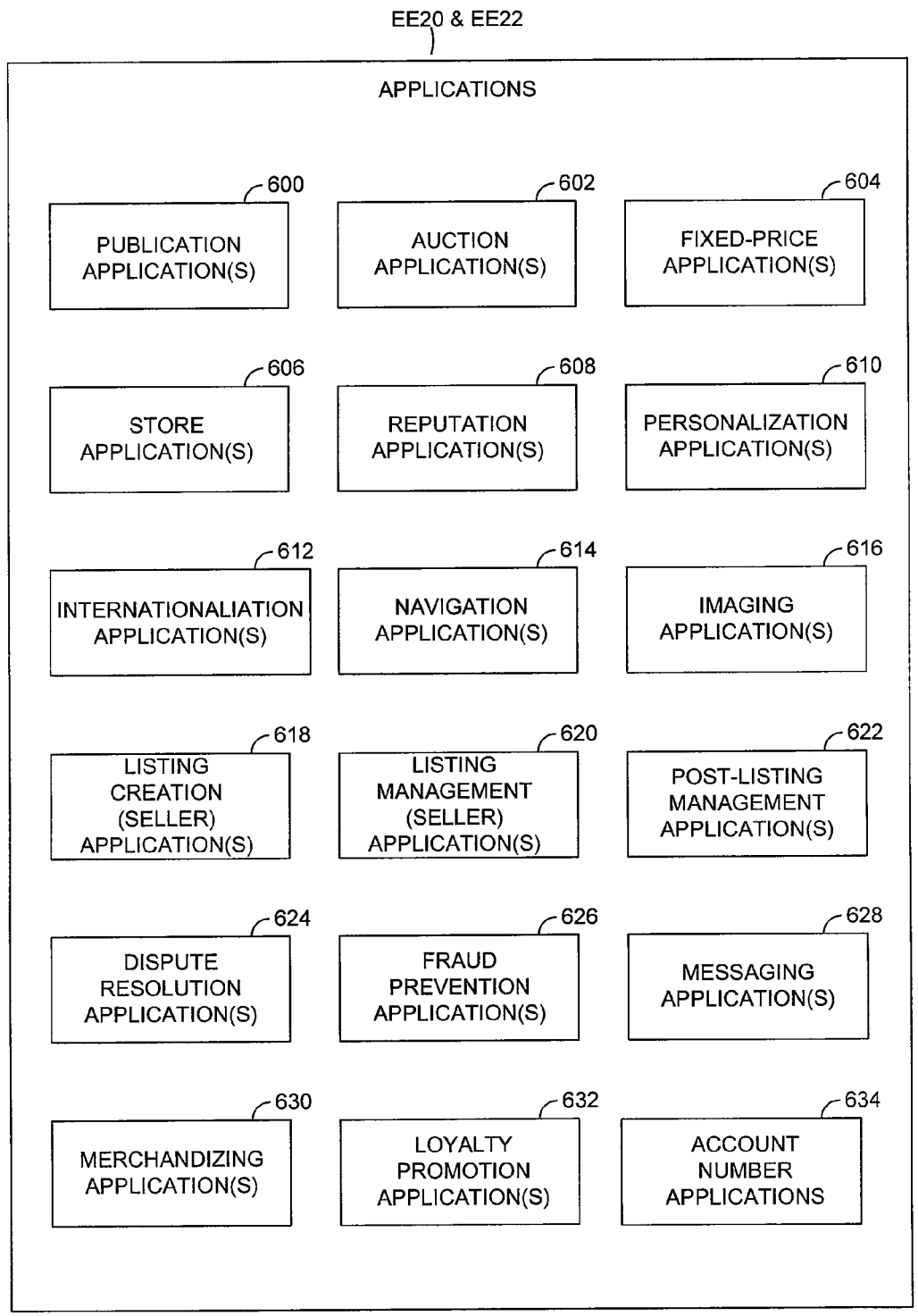
FIG. 6 is a block diagram illustrating multiple applications that, in an example embodiment, are provided as part of a networked system.

FIG. 6 is a block diagram illustrating multiple applications 520 and 522 of FIG. 5 that, in one example embodiment, are provided as part of the networked system 502 of FIG. 5. The applications 520 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access one or more databases 526 via the database servers 524 of FIG. 5.

The networked system 502 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 520 are shown to include at least one publication application 600 and one or more auction applications 602 which support auction-format listing and price setting mechanisms (e.g., English, Dutch, Vickrey, Chinese, Double, Reverse auctions etc.). The various auction applications 602 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 604 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 606 allow a seller to group listings within a "virtual" store, which may be branded and otherwise personalized by and for the seller. Such a virtual store may also offer promotions, incentives and features that are specific and personalized to a relevant seller.

Reputation applications 608 allow users that transact, utilizing the networked system 502 of FIG. 5, to establish, build and maintain reputations, which may be made available and published to potential trading partners. Consider that where, for example, the networked system 502 supports person-to-person trading, users may otherwise have no history or other reference information whereby the trustworthiness and credibility of potential trading partners may be assessed. The reputation applications 608 allow a user, for example through feedback provided by other transaction partners, to establish a reputation within the networked system 502 over time. Other potential trading partners may then reference such a reputation for the purposes of assessing credibility and trustworthiness.

Personalization applications 610 allow users of the networked system 502 to personalize various aspects of their interactions with the networked system 502. For example a user may, utilizing an appropriate personalization application 610, create a personalized reference page at which information regarding transactions to which the user is (or has been) a party may be viewed. Further, a personalization application 610 may enable a user to personalize listings and other aspects of their interactions with the networked system 502 and other parties.

The networked system 502 may support a number of marketplaces that are customized, for example, for specific geographic regions. A version of the networked system 502 may be customized for the United Kingdom, whereas another version of the networked system 502 may be customized for the United States. Each of these versions may operate as an independent marketplace, or may be customized (or internationalized) presentations of a common underlying marketplace. The networked system 502 may accordingly include a number of internationalization applications 612 that customize information (and/or the presentation of information) by the networked system 502 according to predetermined criteria (e.g., geographic, demographic or marketplace criteria). For example, the internationalization applications 612 may be used to support the customization of information for a number of regional websites that are operated by the networked system 502 and that are accessible via respective web servers 516 of FIG. 5.

Navigation of the networked system 502 may be facilitated by one or more navigation applications 614. For example, a search application (as an example of a navigation application) may enable key word searches of listings published via the networked system 502. A browse application may allow users to browse various category, catalogue or inventory data structures according to which listings may be classified within the networked system 502. Various other navigation applications may be provided to supplement the search and browsing applications.

In order to make listings, available via the networked system 502, as visually informing and attractive as possible, the marketplace applications 520 may include one or more imaging applications 616 utilizing which users may upload images for inclusion within listings. An imaging application 616 also operates to incorporate images within viewed listings. The imaging applications 616 may also support one or more promotional features, such as image galleries that are presented to potential buyers. For example, sellers may pay an additional fee to have an image included within a gallery of images for promoted items.

Listing creation applications 618 allow sellers conveniently to author listings pertaining to goods or services that they wish to transact via the networked system 502 and listing management applications 620 allow sellers to manage such listings. Specifically, where a particular seller has authored and/or published a large number of listings, the management of such listings may present a challenge. The listing management applications 620 provide a number of features (e.g., auto-relisting, inventory level monitors, etc.) to assist the seller in managing such listings. One or more post-listing management applications 622 may also assist sellers with a number of activities that typically occur post-listing. For example, upon completion of an auction facilitated by one or more auction applications 602, a seller may wish to leave feedback regarding a particular buyer. To this end, a post-listing management application 622 may provide an interface to one or more reputation applications 608, so as to allow the seller conveniently to provide feedback regarding multiple buyers to the reputation applications 608.

Dispute resolution applications 624 provide mechanisms whereby disputes arising between transacting parties may be resolved. For example, the dispute resolution applications 624 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 626 implement fraud detection and prevention mechanisms to reduce the occurrence of fraud within the networked system 502.

Messaging applications 628 are responsible for the generation and delivery of messages to users of the networked system 502, such messages for example advising users regarding the status of listings at the networked system 502 (e.g., providing "outbid" notices to bidders during an auction process or to provide promotional and merchandising information to users). Respective messaging applications 628 may utilize any one having a number of message delivery networks and platforms to deliver messages to users. For example, messaging applications 628 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, Wi-Fi, WiMAX) networks.

Merchandising applications 630 support various merchandising functions that are made available to sellers to enable sellers to increase sales via the networked system 502. The merchandising applications 630 also operate the various merchandising features that may be invoked by sellers, and may monitor and track the success of merchandising strategies employed by sellers.

The networked system 502 itself, or one or more parties that transact via the networked system 502, may operate loyalty programs that are supported by one or more loyalty/promotions applications 632. For example, a buyer may earn loyalty or promotions points for each transaction established and/or concluded with a particular seller, and be offered a reward for which accumulated loyalty points can be redeemed.

Card number applications(s) 634, in some example embodiments, may be included in the applications 520 and/or 522 of FIG. 5 to process requests for temporary card numbers (e.g., the temporary account number/expiration date 203 of FIG. 2). In such example embodiments, a card number request may be submitted via the account access card 513 of FIG. 5 to the card number application(s) 634. In some example embodiments, the account access card 513 may generate an API call to request the temporary card number and the API server 514 may receive the request and forward it to the card number applications 634 using a command protocol compatible with the card number application(s) 634. Alternatively or additionally, the account access card 513 of FIG. 5 may request the temporary account number via a web browser running on the account access card 513 and the web server 516. The example web server 516 may in turn forward a compatible request command to the card number application(s) 634.

In various example embodiments, the card number applications 634 may receive the request for the temporary account number and process the request to issue the temporary card number to the account access card 513. The card number application's processing of the request for the temporary account number may include validating the account access card 513 based on a persistent card number assigned to the account access card 513. If the account access card is determined to be valid, the temporary card number may be generated, associated with the account access card 513 (e.g., using persistent card number) and transmitted to the account access card 513. In various example embodiments, tables within the databases 526 are read from and written to determine validity and to record generated temporary card numbers.

Figures 7, 8:
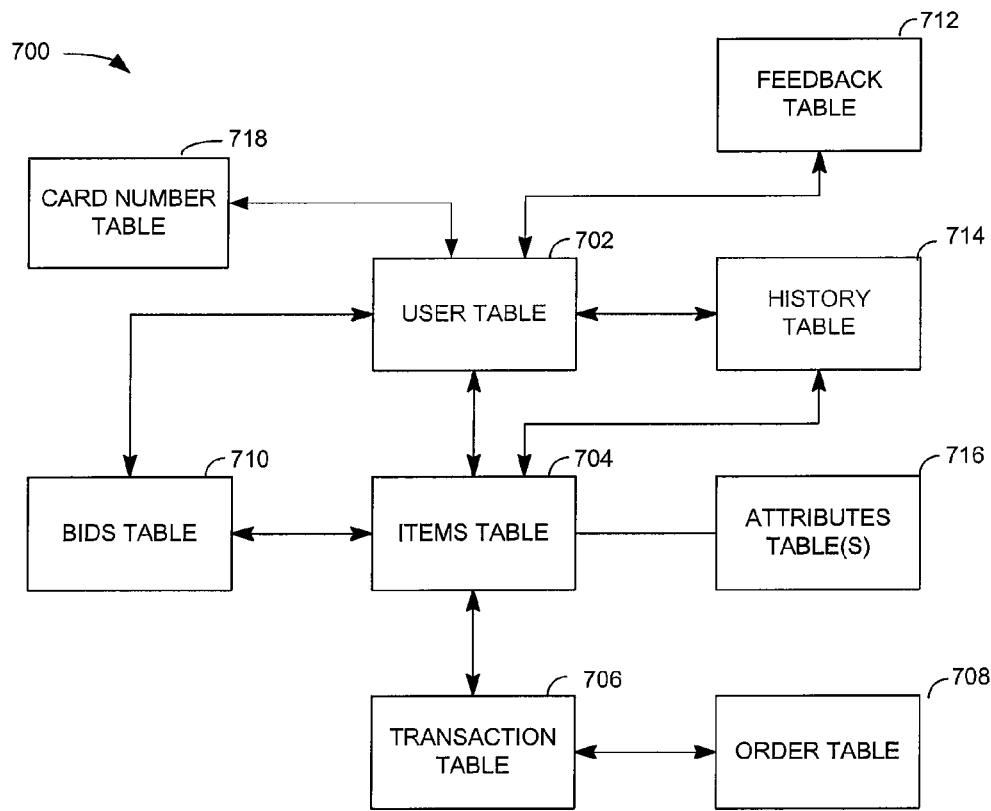
FIG. 7 is a high-level entity-relationship diagram, illustrating various tables that may be maintained within databases, and that are utilized by and support applications.
FIG. 8 is an example card number table, in accordance with an example embodiment.

FIG. 7 is a high-level entity-relationship diagram, illustrating various tables 700 that may be maintained within the databases 526, and that are utilized by and support the applications 520 and 522 of FIG. 5. A user table 702 contains a record for each registered user of the networked system 502 of FIG. 5, and may include identifier, address and financial instrument information (e.g., the account access card 513 of FIG. 5) pertaining to each such registered user. A user may operate as a seller, a buyer or both, within the networked system 502. In one example embodiment, a buyer may be a user that has accumulated value (e.g., commercial or proprietary currency), and is accordingly able to exchange the accumulated value for items that are offered for sale by the networked system 502.

The tables 700 also include an items table 704 in which are maintained item records for goods and services that are available to be, or have been, transacted via the networked system 502. Each item record within the items table 704 may furthermore be linked to one or more user records within the user table 702, so as to associate a seller and one or more actual or potential buyers with each item record.

A transaction table 706 contains a record for each transaction (e.g., a purchase or sale transaction) pertaining to items for which records exist within the items table 704.

An order table 708 is populated with order records, each order record being associated with an order. Each order, in turn, may be with respect to one or more transactions for which records exist within the transaction table 706.

Bid records within a bids table 710 each relate to a bid received at the networked system 502 in connection with an auction-format listing supported by an auction application 502 of FIG. 5. A feedback table 712 is utilized by one or more reputation applications 508 of FIG. 5, in one example embodiment, to construct and maintain reputation information concerning users. A history table 714 maintains a history of transactions to which a user has been a party. One or more attributes tables 716 record attribute information pertaining to items for which records exist within the items table 704. Considering only a single example of such an attribute, the attributes tables 716 may indicate a currency attribute associated with a particular item, the currency attribute identifying the currency of a price for the relevant item as specified in by a seller.

A card number table 718 may include records pertaining to account access cards belonging to users of the networked system 502 of FIG. 5. Such records may associate user identifiers with persistent card numbers and their expiration dates. In various example embodiments, records may further associate the most recently issued temporary card number, if any, for each identifier/persistent card number pairing.

FIG. 8 provides further details regarding the card number table 718 shown in FIG. 7 to be maintained within the databases 526 of FIG. 5. In FIG. 8, a user ID column 802 is shown to include a user ID for users registered with the network system whose financial information includes a persistent card number an associated expiration date. A persistent card number/expiration date column 804 is shown to include a persistent card number associated with each user ID. A temporary card number column 806 may include a particular temporary card number that has most recently been issued to a user identified with a user ID in the user ID column 802.

For example, row 808 of the table 800 is shown to include user ID "2" being associated with the persistent card number "3141516171819202" and temporary card number "T788889999101011" having expiration times of "12-11" and "10-11-08; 1330" respectively. It may be noted that, in this example, the representation of the temporary card number expiration time includes a calendar date and military time.

A temporary card number/expiration time history column 807 is shown to include a history of temporary card numbers obtained by a user in the past. In an example embodiment, the temporary card numbers obtained within the previous 24-hours is recorded. Temporary card number history may be recorded for periods shorter or longer than 24-hours. The temporary card number/expiration time history 807 in the card number table 800 may be accessed by payment applications 522 of FIG. 5 for the purpose of reconciling payments associated with the historical temporary card numbers.

Figure 9:
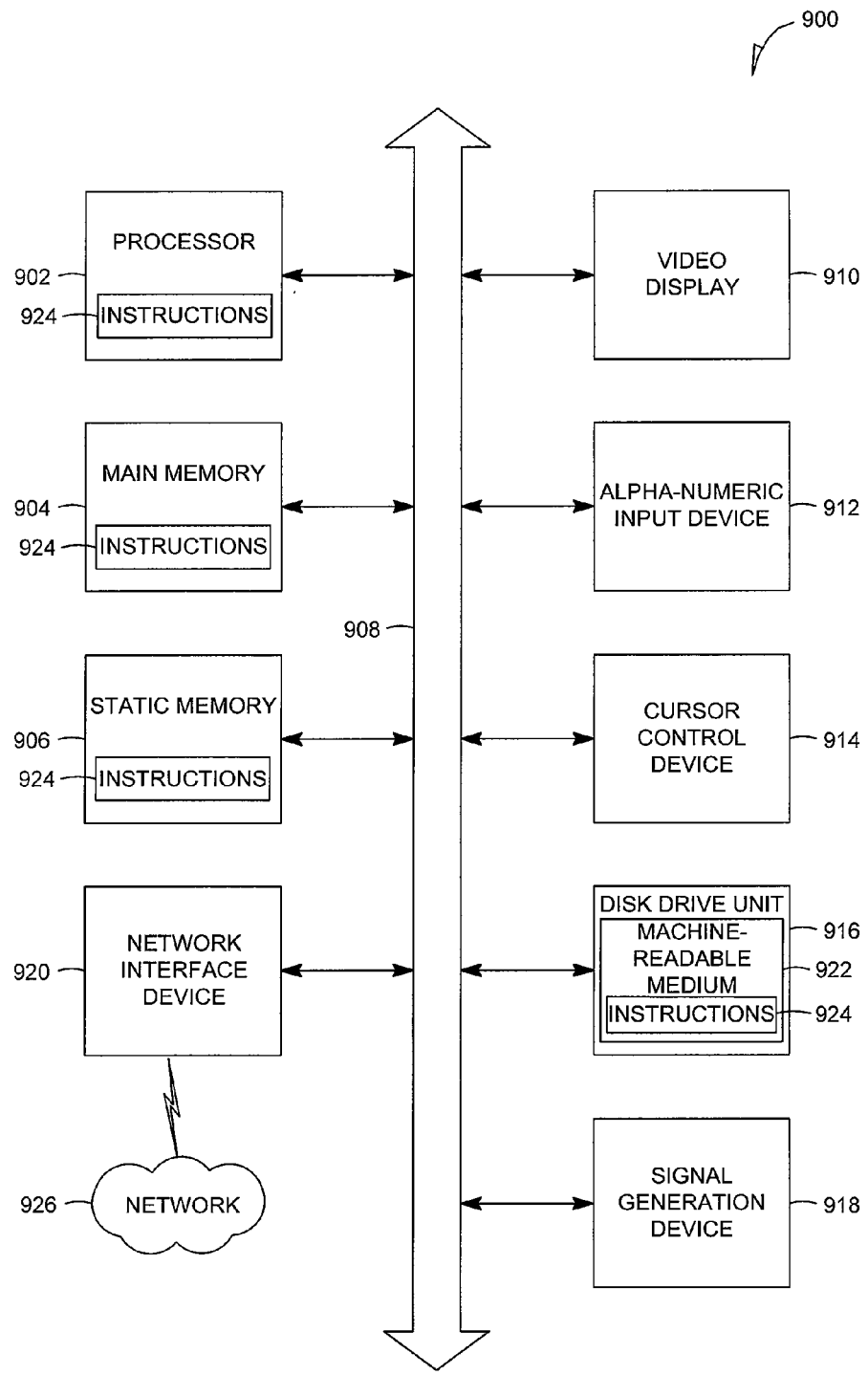
FIG. 9 shows a diagrammatic representation of a machine in the example form of a computer system within which a set of instructions, for causing the machine to perform any one or more of the methodologies discussed herein, may be executed.

FIG. 9 shows a diagrammatic representation of a machine in the example form of a computer system 900 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU) a graphics processing unit (GPU) or both), a main memory 904 and a static memory 906, which communicate with each other via a bus 908. The computer system 900 may further include a video display unit 910 (e.g., an LCD) or a cathode ray tube (CRT)). The computer system 900 also includes an alphanumeric input device 912 (e.g., a keyboard), a cursor control device 914 (e.g., a mouse), a disk drive unit 916, a signal generation device 918 (e.g., a speaker) and a network interface device 920.

The disk drive unit 916 includes a machine-readable medium 922 on which is stored one or more sets of instructions 924 (e.g., software) embodying any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media.

The instructions 924 may further be transmitted or received over a network 926 via the network interface device 920.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present subject matter. The term "machine-readable medium" shall accordingly be taken to include, but not be limited to, solid-state memories, optical and magnetic media and carrier wave signals.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Thus, a method and system to test executable instructions have been described. The above description is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

What is claimed is:

1. An account access device comprising:
    a selector;
    a requester coupled with the selector, the requester to generate, at the account access device, a second request for a second account code responsive to receiving a first request for the second account code, the first request for the second account code associated with activation of the selector by a user of the account access device, the requester to receive the second account code from a value holding account associated with the account access device; and
    a provider coupled with the requester, the provider to provide, at the account access device, the second account code based on the requester receiving the first request for the second account code, a first account code to allow access to a value holding account for a first determinable period, and the second account code to allow access to the value holding account for a second determinable period that is different from the first determinable period.

2. The account access device of claim 1, wherein the account access device is a financial instrument.

3. The device of claim 1, wherein the requester includes a wireless receiver to receive the first request via wireless connection.

4. The device of claim 1, wherein the requester is to transmit the second request for the second account code to an account server associated with the value holding account.

5. The device of claim 4, wherein the provider is to receive the second account code from the account server, based on the second request for the second account code.

6. The device of claim 5, wherein the requester is to wirelessly transmit the second request for the second account code, and the provider is to wirelessly receive the second account code.

7. The device of claim 1, wherein the provider is to provide the second account code via at least one of a display associated with the account access device, a barcode associated with the account access device and a magnetic encoder associated with the account access device.

8. The device of claim 1 wherein the value holding account includes at least one of a credit card account, a charge card account, a debit card account and a gift card account, and the first account code includes at least one of a credit card number, a charge card number, a debit card number and a gift card number.

9. The device of claim 1 wherein the second determinable period is to expire at or before an expiration time of the first determinable period.

* * * * *